UNITED STATES PATENT OFFICE 2,047,314

LIGNOCELLULOSIC MATERIAL

Henry Dreyfus, London, England

No Drawing. Application January 9, 1934, Serial No. 705,899. In Great Britain February 8, 1933

9 Claims. (Cl. 92—13)

This invention relates to the treatment of lignocellulosic materials, and especially to the production from lignocellulosic materials such as wood, straw, grass and the like of cellulose or cellulosic products which are suitable for use in the production of cellulose esters and especially cellulose acetate, from which may be manufactured articles such as filaments, yarns, films, moulding powders, plastics, etc. of good quality.

Although acetates and other esters may be made from cellulose which has been obtained from wood or the like by any of the processes heretofore employed, such as the sulphite, sulphate and soda processes, articles such as filaments, yarns, films and the like manufactured from such cellulose esters have in general failed to give complete satisfaction. The reasons for this are probably to be found in the various physical and chemical changes undergone by the cellulose during the pulping process; for example the cellulose in the wood may be attacked by the pulping liquors with the formation, inter alia, of considerable amounts of β-cellulose. While these physical and chemical changes are not of great importance when the pulp is to be employed for the manufacture of paper, or even of articles such as filaments and films comprising regenerated cellulose, for example by the viscose process, they do exert a marked and unfavourable effect on the properties of articles comprising esters of cellulose made from the pulp.

I have now found that a cellulosic product which is very suitable for use in the manufacture of filaments, yarns, films, etc. comprising cellulose acetate or other cellulose esters may be obtained by subjecting lignocellulosic materials to treatment with a dilute solution of an alkali.

In a very valuable form of the invention the lignocellulosic materials are subjected to a treatment with a dilute alkali solution followed by a treatment with a more concentrated alkali solution. The two stages in a process of this kind are hereinafter referred to in the specification and claims as a dilute alkali treatment and a concentrated alkali treatment respectively.

The dilute alkali treatment may be carried out with, for example, sodium hydroxide solution of concentration below 4%, and preferably below about 2%, solutions of concentration between about ½ and 1% being very useful. For the concentrated alkali treatment there may be employed, for example, sodium hydroxide solution of concentration between about 10 and 15 or 20%.

The dilute alkali treatment is preferably carried out at temperatures below about 150° C. and under pressures higher than those produced by the liquor at the temperatures employed. Thus, for example, the treatment may advantageously be carried out at a temperature between about 100° and 140° C., for instance, between 110° and 130° C., and especially between 120° and 130° C. Pressures between for example 50 and 150 lbs. per square inch or higher may be employed. The pressure which is required over and above that produced by the alkaline liquor at the temperature employed may be obtained by adding one or more volatile liquids, for instance petroleum ether, to the said liquor, by introducing inert gases such as nitrogen or air into the digester, or in any other convenient way.

The concentrated alkali treatment is preferably conducted at or about normal atmospheric temperature, i. e. at a temperature of the order of 10°–20° C. If desired this stage in the process may also be effected under elevated pressures, but in general the use of atmospheric pressure will give quite satisfactory results.

It is usually preferable to employ the alkali in comparatively large quantities. For example, the dilute alkali solution may be employed in such quantities that the lignocellulosic material is at all times during the process completely immersed in the solution. Thus the material may be treated with up to its own weight or more of alkali, reckoned as the anhydrous compound. For example, wood chips may be treated with a 1% alkali solution containing upwards of 25% and especially between 25 and 50 or 60% of their weight of sodium hydroxide, while when employing solutions of higher concentration, for instance 2% or 2½%, a larger amount of alkali may be employed, for example such that the weight of the solution is about 30–45 times that of the materials. More or less alkali may however be used if desired. The concentrated alkali treatment may be effected with similar quantities of the alkali, reckoned as the anhydrous compound.

The dilute alkali treatment may be carried out until the product contains only a comparatively small quantity of lignin and other impurities. Thus, for example, the lignocellulosic materials may be treated with dilute alkali for a period between 6 and 12 hours or more, the precise time to be employed depending, among other things, on the nature of the starting material, the concentration of the solution, the reaction conditions and the precise nature of the product desired. The concentrated alkali treatment may in general be carried out for periods between about 3 and 7 hours or more.

Advantageously the products obtained after the treatment with concentrated alkali may be bleached with chlorine or with a compound capable of giving rise to chlorine, such as calcium hypochlorite. If desired such a chlorine treatment may take place between the two alkali treatments, but it is preferable to effect the concentrated alkali treatment before the treatment with chlorine.

Before being subjected to the process which is the subject of my invention, the lignified material may if desired be treated with a dilute alkali solution or other agent adapted to remove resins and the like. Preferably a preliminary dilute alkali treatment of this kind is effected at a comparatively low temperature, for example at a temperature below about 45° C., although if other resin removing agents are used other temperatures may be employed; for example, the wood or other material may be extracted with water, in which case higher temperatures may be employed with advantage. However, even in the absence of a pretreatment of this kind the alkaline liquors employed in the present process are themselves well adapted to remove resins and the like from the materials during the process.

Any convenient means may be employed to effect a thorough penetration of the wood or other lignocellulosic material by the reagents employed according to the invention, and especially by the dilute alkali liquor. Thus, the material may be employed in a finely divided form; for instance wood may be treated in the form of chips or the like. If desired, moreover, the vessel containing the material may be evacuated to any desired extent before the liquor is admitted thereto, the contents of the vessel may be subjected to agitation (e. g. by employing a rotating vessel), and/or any other device for ensuring or promoting a thorough impregnation may be adopted.

The cooking process may be carried on for such a time as will yield a product still containing substantial quantities of lignin, for example up to 8% of lignin, especially when it is desired to produce pulps of the kraft type. However, owing to the nature of the new process, comparatively strong pulps may be obtained even when cooking is carried on for a period sufficient to reduce the lignin content to a much smaller figure, and the special advantages of the invention may be realized best when the product contains very small amounts, for example below 1 or 2% of lignin.

The product obtained by my new process may be used for any purpose for which chemical pulps are employed, but as already stated, it is especially useful for the manufacture of filaments, yarns, films and other articles comprising an ester of cellulose, and especially of articles comprising cellulose acetate. Before being subjected to the esterification process, the cellulose may advantageously be pretreated, for example with acetic, formic and/or other lower aliphatic acids, as described in my French specification No. 565,654 or with the vapours of such acids as in my U. S. Patent No. 1,831,101. Any other desired form of pretreatment and any convenient esterification process may be employed, and the cellulose ester produced may be spun into filaments, cast as films or otherwise employed in any suitable manner. Moreover, the cellulose produced according to the invention may be used for the manufacture of other products such as high grade cellulose ethers, viscose, etc. Pretreatments with acids are not in general necessary when manufacturing such derivatives.

Although the invention has been described with particular reference to the case where the dilute alkali treatment is followed by a concentrated alkali treatment, this latter step may if desired be omitted, and the lignocellulosic materials may be treated with dilute alkali only, for example under the pressure produced by the liquor at tne temperature employed. The products of such a process may be employed in any convenient way, if desired after a further treatment, e. g. with chlorine and/or with an acid, for example as described above.

The following examples illustrate the invention, but it is not in any way limited thereby:—

*Example 1*

Wood in the form of small chips is introduced into an autoclave together with 40 times its weight of a 2½% solution of caustic soda, and air is pumped into the autoclave to produce a pressure therein of about 50 lbs. per square inch. The autoclave is then heated to a temperature between 125° and 135° C., thus producing a total pressure in the neighbourhood of 120 lbs. per square inch. The autoclave is maintained at this temperature for a period of 9 hours, after which it is allowed to cool and the products are removed. The cellulose produced is then subjected to a treatment with a 15% solution of caustic soda in the cold for a period of 3 hours under atmospheric pressure. It is then removed from the alkali solution and washed, and if desired subjected to a chlorine bleach. The pulp so obtained contains a very favourable proportion of α-cellulose with comparatively small quantities of β-cellulose.

*Example 2*

The process of Example 1 is carried out with the substitution of a 1% caustic soda solution for the 2½% solution therein specified. A product is obtained which closely resembles that obtained when employing the 2½% solution.

*Example 3*

Small wood chips are fed into an autoclave together with 50 times their weight of a 2% caustic soda solution. The contents of the autoclave are raised to a temperature of 145° C. under the pressure developed by the alkaline liquor at this temperature, and these conditions are maintained for a period of 12 hours. The contents of the autoclave are then allowed to cool, and the liquor is run off from the solid cellulosic material. The latter may be subjected to a concentrated alkali treatment in the cold or to any other form of further treatment, or may be at once employed without such treatment.

What I claim and desire to secure by Letters Patent is:—

1. Process for the manufacture of cellulose from ligno-cellulosic materials, which comprises subjecting the materials to a treatment with a dilute alkali solution at a temperature above 100° C., the alkali being employed in amount upwards of 25% of the dry weight of the materials, then to a treatment with a more concentrated alkali and then treating with a bleaching agent comprising chlorine.

2. Process for the manufacture of cellulose from wood, which comprises subjecting the wood to a treatment with a dilute alkali solution having a concentration of at least ½% at a temperature between 100 and 150° C., the alkali being employed in amount upwards of 25% of the dry weight of the wood, and then to a treatment with a more concentrated alkali at a temperature of the order of 10 to 20° C.

3. Process for the manufacture of cellulose from ligno-cellulosic materials, which comprises subjecting the materials to a treatment with a dilute alkali solution at a temperature between 100 and 150° C. and under a pressure in excess of that produced by the dilute alkaline liquor at the temperature employed, the alkali being employed in amount upwards of 25% of the dry weight of the materials, and then to a treatment with a more concentrated alkali at a temperature of the order of 10 to 20° C.

4. Process for the manufacture of cellulose from ligno-cellulose materials, which comprises subjecting the materials to a treatment with a dilute alkali solution at a temperature between 110 and 130° C. and under a pressure between 50 and 150 lbs. per square inch, the alkali being employed in amount upwards of 25% of the dry weight of the materials, and then to a treatment with a more concentrated alkali at a temperature of the order of 10 to 20° C.

5. Process for the manufacture of cellulose from wood, which comprises subjecting the wood to a treatment with a caustic alkali solution of concentration between ½ and 4% at a temperature between 100 and 150° C., the alkali being employed in amount upwards of 25% of the dry weight of the wood, and then to a treatment with a more concentrated alkali at a temperature of the order of 10 to 20° C.

6. Process for the manufacture of cellulose from ligno-cellulosic materials, which comprises subjecting the materials to a treatment with a caustic alkali solution of concentration below 4% at a temperature between 100° and 150° C., and under a pressure in excess of that produced by the dilute alkaline liquor at the temperature employed, and then to a treatment with a caustic alkali solution of concentration between 10 and 20% at a temperature of the order of 10 to 20° C., the alkali being employed in each treatment in amount upwards of 25% of the dry weight of the ligno-cellulosic materials.

7. Process for the manufacture of cellulose from ligno-cellulosic materials, which comprises subjecting the materials to a treatment with a caustic alkali olution of concentration between ½ and 1% at a temperature between 100 and 150° C. and under a pressure in excess of that produced by the dilute alkaline liquor at the temperature employed, and then to a treatment with a caustic alkali solution of concentration between 10 and 20% at a temperature of the order of 10 to 20° C., the alkali being employed in each treatment in amount upwards of 25% of the dry weight of the materials.

8. Process for the manufacture of cellulose from ligno-cellulosic materials, which comprises subjecting the materials to a treatment with a caustic alkali solution of concentration between ½ and 1% at a temperature between 110 and 130° C. and under a pressure between 50 and 150 lbs. per square inch, and then to a treatment with a caustic alkali solution of concentration between 10 and 20% at a temperature of the order of 10 to 20° C., the alkali being employed in each treatment in amount between 25 and 60% of the dry weight of the materials.

9. Process according to claim 8, in which the concentrated alkali treatment is followed by a treatment with a bleaching agent comprising chlorine.

HENRY DREYFUS.